(12) United States Patent
Wargo et al.

(10) Patent No.: US 12,519,838 B2
(45) Date of Patent: Jan. 6, 2026

(54) SUBSTANTIATING A COMPLIANCE STANDARD WITH SECONDARY EVIDENCE

(71) Applicant: Florida Power & Light Company, Juno Beach, FL (US)

(72) Inventors: Robert K. Wargo, Riviera Beach, FL (US); Carlos N. Morales, Palm City, FL (US); Brenton A. Roberts, Stuart, FL (US); Richard S. Purvis, Doral, FL (US)

(73) Assignee: FLORIDA POWER & LIGHT COMPANY, Junobeach, FL (US)

( * ) Notice: Subject to any disclaimer, the term of this patent is extended or adjusted under 35 U.S.C. 154(b) by 58 days.

(21) Appl. No.: 18/662,297

(22) Filed: May 13, 2024

(65) Prior Publication Data
US 2025/0350642 A1 Nov. 13, 2025

(51) Int. Cl.
H04L 29/06 (2006.01)
H04L 9/40 (2022.01)

(52) U.S. Cl.
CPC .................................. H04L 63/20 (2013.01)

(58) Field of Classification Search
None
See application file for complete search history.

(56) References Cited

U.S. PATENT DOCUMENTS

| 10,116,165 B2 | 10/2018 | Bernal et al. |
| 11,698,845 B2 | 7/2023 | Hicks et al. |
| 12,147,453 B1 * | 11/2024 | Smith ................ G06F 16/287 |
| 2004/0193634 A1 * | 9/2004 | Goodlett ............. G06Q 10/06 707/999.102 |
| 2005/0091067 A1 * | 4/2005 | Johnson ........... G06Q 10/0639 705/317 |

(Continued)

FOREIGN PATENT DOCUMENTS

WO WO-2024226848 A2 * 10/2024 ............. G06N 3/08

OTHER PUBLICATIONS

WOISR: Notification of Transmittal of the International Search Report and the Written Opinion of the International Searching Authority, or the Declaration, mailed Jun. 3, 2025 for corresponding PCT/US2025/024511.

*Primary Examiner* — Jeffery L Williams
(74) *Attorney, Agent, or Firm* — Tarolli, Sundheim, Covell & Tummino LLP

(57) ABSTRACT

Systems and methods for substantiating a compliance standard with secondary evidence. In one example, a method includes identifying a first evidentiary package of a set of evidentiary packages to substantiate a compliance standard of a regulated entity based on a regulatory compliance report. Evidentiary packages of the set of evidentiary packages defines status indicators for the regulated entity to meet the compliance standard. The method also includes analyzing a first set of operational data associated with the first evidentiary package. The method further includes determining a second evidentiary package to substantiate the compliance standard in response to the first set of operational data being deficient. The method yet further includes analyzing a second set of operational data based on the second evidentiary package. The method includes applying a compliance result to the compliance standard based on an analysis of the second set of operational data.

20 Claims, 5 Drawing Sheets

(56) References Cited

U.S. PATENT DOCUMENTS

| | | | |
|---|---|---|---|
| 2008/0059123 A1* | 3/2008 | Estberg | G06Q 10/06 |
| | | | 702/182 |
| 2012/0102543 A1* | 4/2012 | Kohli | H04L 63/20 |
| | | | 726/1 |
| 2013/0120156 A1* | 5/2013 | Swaminathan | G08C 19/00 |
| | | | 340/870.02 |
| 2014/0067448 A1 | 3/2014 | Joshi et al. | |
| 2017/0193240 A1* | 7/2017 | Baker | H04L 63/105 |
| 2018/0167414 A1* | 6/2018 | O'Reilly | H04L 63/20 |
| 2018/0285887 A1 | 10/2018 | Maung et al. | |
| 2020/0272963 A1 | 8/2020 | Chait | |
| 2021/0295210 A1 | 9/2021 | Wetherbee et al. | |
| 2021/0397735 A1* | 12/2021 | Samatov | G06F 9/451 |
| 2022/0329630 A1 | 10/2022 | Li | |
| 2023/0004468 A1 | 1/2023 | Hicks et al. | |
| 2023/0018159 A1 | 1/2023 | Barroso et al. | |
| 2025/0139645 A1* | 5/2025 | Sardanopoli | G06Q 30/018 |
| 2025/0258152 A1* | 8/2025 | Crabtree | C12H 3/00 |

\* cited by examiner

SUBSTANTIATING A COMPLIANCE STANDARD WITH SECONDARY EVIDENCE

TECHNICAL FIELD

This description relates to substantiating a compliance standard for a regulated entity by identifying a second evidentiary package in response to determining that a first evidentiary package is deficient.

BACKGROUND

Regulated entities are businesses that operate in sectors of public importance and are therefore regulated by a centralized regulatory authority. For example, bulk utility systems are regulated entities that operate in the electric, water, oil, or gas sectors. Given the importance of these sectors to society, a centralized regulatory authority monitors the operation and functioning of the bulk utility systems in a territory. For example, NERC (North American Electric Reliability Corporation) compliance standards are the mandatory reliability and security standards that apply to entities that own or manage bulk utility systems that are part of the U.S. and Canadian electrical power grid. Centralized authorities, like NERC, establish the compliance standards for the territory to safeguard the bulk utility system from cyber and/or physical security threats and ensure the reliability of the bulk utility systems. Regulatory authorities of the centralized regulatory authority determine the evidentiary requirements to be met to substantiate compliance with the mandatory compliance standards.

SUMMARY

In one example, a method includes identifying a first evidentiary package of a set of evidentiary packages to substantiate a compliance standard of a regulated entity based on a regulatory compliance report. Evidentiary packages, of the set of evidentiary packages, define status indicators for the regulated entity to meet the compliance standard. The method also includes analyzing a first set of operational data associated with the first evidentiary package. The method further includes determining a second evidentiary package to substantiate the compliance standard in response to the first set of operational data being deficient. The method yet further includes analyzing a second set of operational data based on the second evidentiary package. The method includes applying a compliance result to the compliance standard based on an analysis of the second set of operational data.

Another example relates to a compliance standard system that includes a memory for storing machine-readable instructions and a processor. The processor accesses the machine-readable instructions and executes the machine-readable instructions as operations. The operations include identifying a first evidentiary package of a set of evidentiary packages to substantiate a compliance standard of a regulated entity based on a regulatory compliance report. Evidentiary packages, of the set of evidentiary packages, define status indicators for the regulated entity to meet the compliance standard. The operations also include analyzing a first set of operational data associated with the first evidentiary package. The operations further include determining a second evidentiary package to substantiate the compliance standard in response to the first set of operational data being deficient. The operations yet further include analyzing a second set of operational data based on the second evidentiary package. The operations include applying a compliance result to the compliance standard based on an analysis of the second set of operational data.

In yet another example, a non-transitory machine-readable medium having machine executable instructions for compliance standard for a regulated entity causing a processor to execute operations. The operations include identifying a first evidentiary package of a set of evidentiary packages to substantiate a compliance standard of a regulated entity based on a regulatory compliance report. Evidentiary packages, of the set of evidentiary packages, define status indicators for the regulated entity to meet the compliance standard. The operations also include analyzing a first set of operational data associated with the first evidentiary package. The operations further include determining a second evidentiary package to substantiate the compliance standard in response to the first set of operational data being deficient. The operations yet further include analyzing a second set of operational data based on the second evidentiary package. The operations include applying a compliance result to the compliance standard based on an analysis of the second set of operational data.

DETAILED DESCRIPTION

Figure 1:
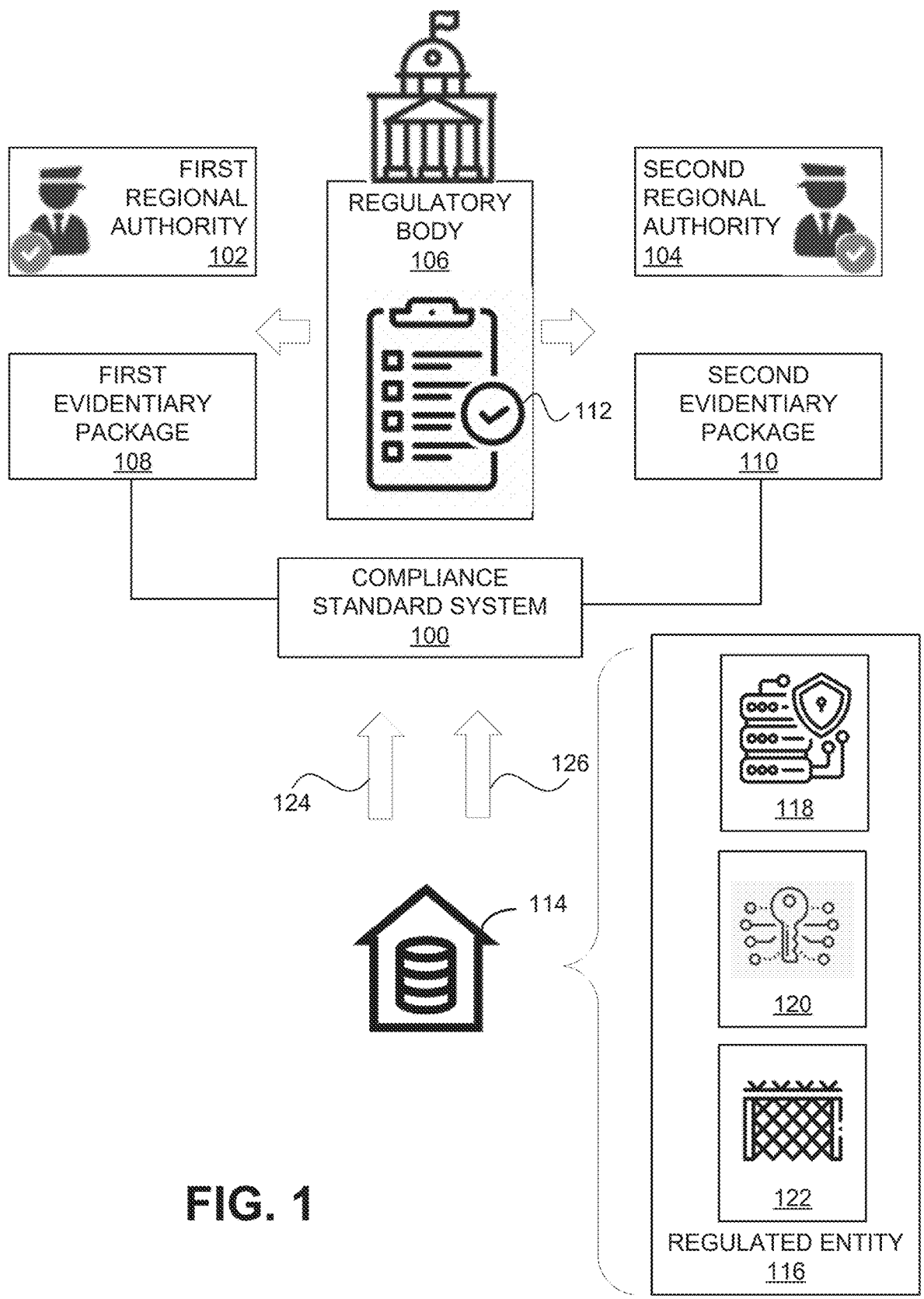
FIG. 1 illustrates a diagram of an example physical environment for a compliance standard system of a regulated entity.

A compliance standard defines the expected operational values (e.g., configurations or states) of assets that maintain a safe and reliable regulated entity in a territory of a centralized regulatory body. The regulated entity may operate in any regulated system such as utilities (e.g., water, cable, trash, sewer, cable, gas, electric, etc.), food and drug, aerospace, etc. A centralized regulatory authority monitors the operation and functioning of the regulated entity.

The centralized regulatory body delegates authority to a number of regulatory authority divisions. In one example of the divisions, the regulatory authorities are geographic areas of the territory. To substantiate that an asset within a geographic region is operating with the expected operational values, the regional authority given jurisdiction of that geographic area collects operational data associated with the asset. In particular, the regional authority specifies parameters in the evidentiary package that correspond to status indicators of the operational data that demonstrate compliance. The operational data corresponding to a specified parameter is analyzed to demonstrate compliance with the compliance standard. For example, the analysis determines whether the status indicators of the operational data comport with the expected operational values. The asset of the regional authority is determined to comply the compliance standard or not based on the analysis.

However, given the dynamic, and sometimes unpredictable, nature of technology, the operational data corresponding to the specified parameters may be unavailable. For example, modifications to assets change the functioning of those assets which can alter the operational data that is collected. Suppose that a security vulnerability is resolved by closing a port of an asset that previously received data packets when the port was open, but the parameters of the evidentiary package identify the received packets as operational data to demonstrate that a network service is operational. The resolution of the security vulnerability prevents the received data packets from being received as operational data even if the network service is functioning properly. Therefore, the compliance standard would not be satisfied, even if the network service is operating with the expected operational values.

This description relates to a compliance standard system that is employable to determine a second evidentiary package to substantiate the compliance standard in response to the first set of operational data being deficient. Continuing the example from above, if the first set of operational data includes the received data packets via the port, the compliance standard system determines a second evidentiary package having parameters that would also demonstrate the network service is operational without relying on the received data packets. For example, the second evidentiary package has a first parameter that that identifies operational data from a server component that provides the network service and/or a second parameter that identifies operational data that network data received from the network service is processed in accordance with the network service. Accordingly, the compliance standard system identifies secondary evidence when the primary evidence is unavailable.

The compliance standard system analyzes and provides the operational data identified by the parameters of the second evidentiary package to satisfy the compliance standard. As one example, if the first set of operational data from a first asset is deficient, the compliance standard system determines a second evidentiary package with parameters that correspond to a second asset that is different than the first asset. From the example above, the first parameter of the second evidentiary package identifies a server component instead of the port. As another example, the second parameter identifies operational data that network data received from the network service is processed in accordance with the network service to demonstrate that the security result of the network service is effective. As yet another example, the second evidentiary package identifies multiple instances of a security event.

Based on the analysis of the second set of operational data corresponding to the parameters of the second evidentiary package, a compliance result is applied to the compliance standard. For example, if the status indicator of the second set of operational data satisfies the expected operational value of the compliance standard, then the compliance result is "secure." Conversely, if the status indicator of the second set of operational data does not satisfy the expected operational value of the compliance standard, then the second set of operational data is classified as an anomaly based on an operational differential between the received operational data and the expected operational value. Based on an analysis of the anomaly the compliance result is applied as either "secure" or "vulnerable."

FIG. 1 illustrates a diagram of an example physical environment for a compliance standard system for a regulated entity. The compliance standard system 100 communicates with a number of regional authorities, including a first regional authority 102 and a second regional authority 104. The first regional authority 102 and the second regional authority 104 are divisions of a regulatory body 106. For example, the first regional authority 102 has a jurisdiction of a first geographical area of a territory of the regulatory body 106. The second regional authority 104 has a jurisdiction of a second geographical area of the territory different than the first geographical area.

Although described with respect to regional authorities as one example of regulatory authorities in FIG. 1, the regulatory authorities may be divided on the basis of other variances, such as political structure, assets, etc. In one example, the first regional authority 102 is a first regulatory authority representing a state or provincial government. The second regional authority 104 is a second regulatory authority representing a national or federal government. In another example, the first regional authority 102 is a first regulatory authority that represents a first set of assets (e.g., cyber assets). The second regional authority 104 is a second regulatory authority that represents a second set of assets (e.g., electronic security perimeter). Accordingly, the geographic regional authorities are one example of regulatory authority variance among others.

The first regional authority 102 is associated with a first evidentiary package 108 and the second regional authority 104 is associated with a second evidentiary package 110. The first evidentiary package 108 and the second evidentiary package 110 include sets of parameters that define status indicators of the operational data to meet a compliance standard based on a regulatory compliance report 112. In particular, the parameters of the first evidentiary package 108 and the second evidentiary package 110 specify the operational data that corresponds to the parameters.

The operational data is received from a centralized data warehouse 114 that communicates with a regulated entity 116. The regulated entity 116 includes the different assets such as cyber assets 118, electronic security perimeter assets 120, and physical security perimeter assets 122. The cyber assets 118 include any programmable electronic device, including hardware, or software, information, which are components of physical assets (e.g., facilities, renewable assets, electric utility assets, etc.) of the regulated entity 116 or enable the physical assets to function. For example, the cyber assets 118 include control systems of physical assets that manage, command, or regulate the behavior of processes of the physical assets. The cyber assets 118 may include data acquisition systems comprising collections of sensors and communication links that act to sample, collect, and provide data regarding the physical assets or a centralized location for display, archiving, or further processing.

The electronic security perimeter assets 120 protect an electronic boundary of the physical assets or cyber assets. For example, the electronic security perimeter assets include a proxy firewall, unified threat management firewall, next-generation firewall, etc. The physical security perimeter assets 122 protect a physical boundary of the physical assets or cyber assets 118 and include, for example, cameras, video monitoring devices, motion sensors, intruder alarms, etc.

The assets 118-122 provide operational data to the compliance standard system 100, in some examples, via the centralized data warehouse 114. The compliance standard system receives a first set of operational data 124. The first evidentiary package 108 includes a first set of parameters corresponding to the first set of operational data 124. Suppose that the first regional authority 102 is attempting to determine whether a cyber asset 118, such as a server, has an access protocol that prevents intrusions. Based on the parameters of the first evidentiary package 108, the first set of operational data 124 should include runtime data (e.g. real-time data from a transmission control protocol (TCP) socket client to the server, metadata, control commands, etc.) regarding the functioning of the access protocol. However, the first set of operational data 124 is deficient for any number of reasons, such as errors in synchronization due to implementation complexity, decoding errors, glitches based on control commands, data corruption or mishandling, etc.

In response to determining that the first set of operational data 124 is deficient, the compliance standard system 100 determines a second evidentiary package 110 that corresponds to a second set of operational data 126. The second evidentiary package 110 identifies the second set of operational data 126 that is different than the first set of operational data 124 to substantiate compliance with the compliance standard. Continuing the example from above, if the first set of operational data 124 including the runtime data of the access protocol is deficient, a second evidentiary package having parameters corresponding to the second set of operational data 126 is determined. For instance, the second evidentiary package 110 is determined based on access of the asset to the second set of operational data which is similar to the first set of operational data. Based on the parameters of the second evidentiary package 110, the second set of operational data 126 includes, for example, log data of an electronic security perimeter asset 120 that includes traffic data, access logs, etc. of the server to demonstrate that the server has an access protocol that prevents intrusions, thereby substantiating compliance with the compliance standard.

The compliance standard system 100 identifies the second evidentiary package 110 when the first set of operational data 124 is deemed insufficient. As one example, the second evidentiary package 110 is determined based on the evidentiary package used by a different regional authority. For example, the if the first evidentiary package 108 of the first regional authority 102 does not yield adequate operational data, the compliance standard system 100 selects the second evidentiary package 110 from the second regional authority 104. As another example, the compliance standard system 100 determines the second evidentiary package based on a system architecture map of the regulated entity 116 that specifies the assets 118-122 and illustrates how the assets 118-122 communicate and interact with one another.

In some examples, the second set of operational data 126 corresponds to the parameters of the second evidentiary package 110. Based on the analysis of the second set of operational data corresponding to the parameters of the second evidentiary package, a status indicator is applied to the compliance standard. For example, if the status indicator of the second set of operational data satisfies the expected operational value of the compliance standard, then the compliance result is "secure." Conversely, if the status indicator of the second set of operational data does not satisfy the expected operational value of the compliance standard, then the second set of operational data is classified as an anomaly based on an operational differential between the received operational data and the expected operational value. Based on an analysis of the anomaly the compliance result is applied as either "secure" or "vulnerable."

Figure 2:
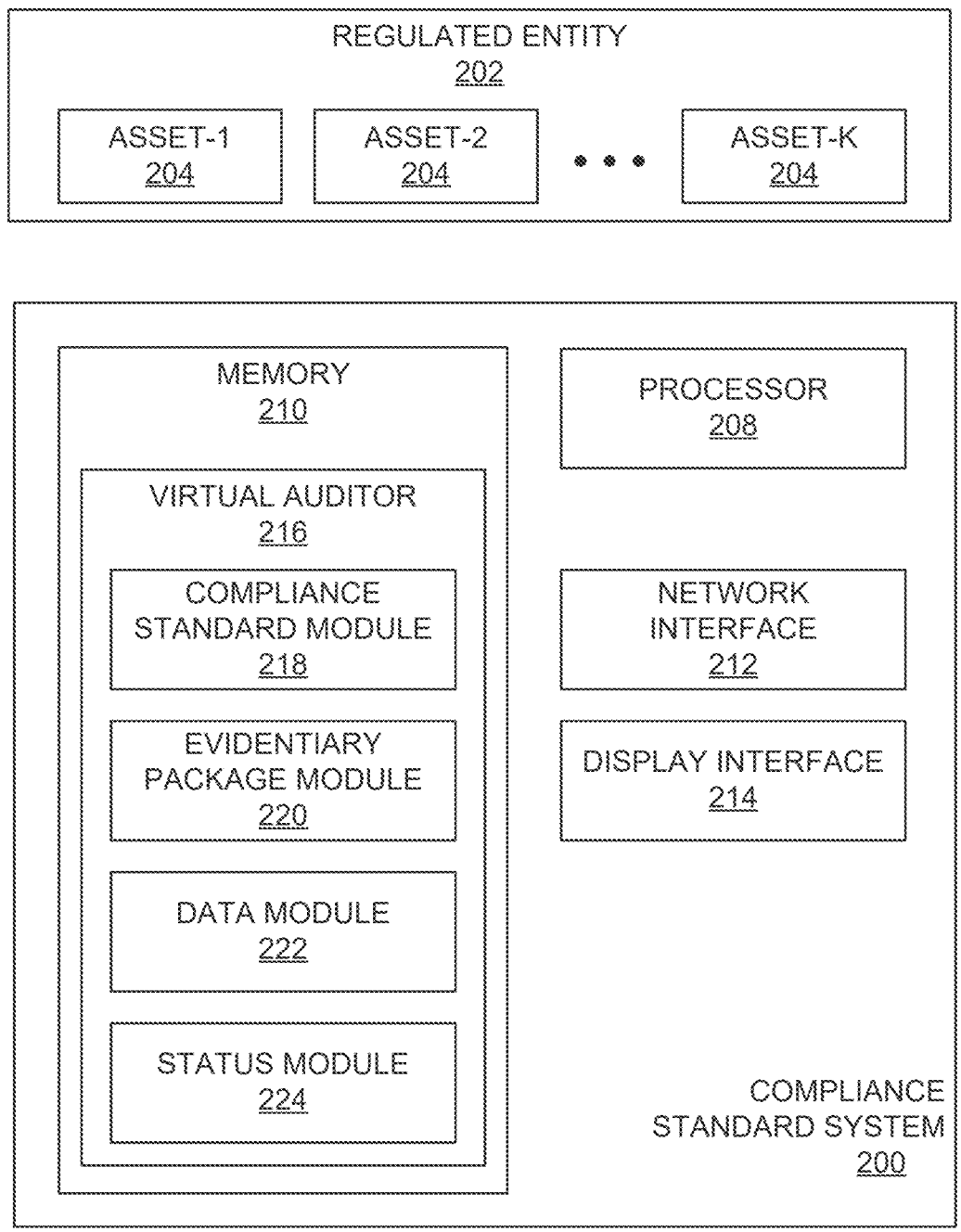
FIG. 2 illustrates an example of an operating environment for a compliance standard system of a regulated entity.
Figure 2:
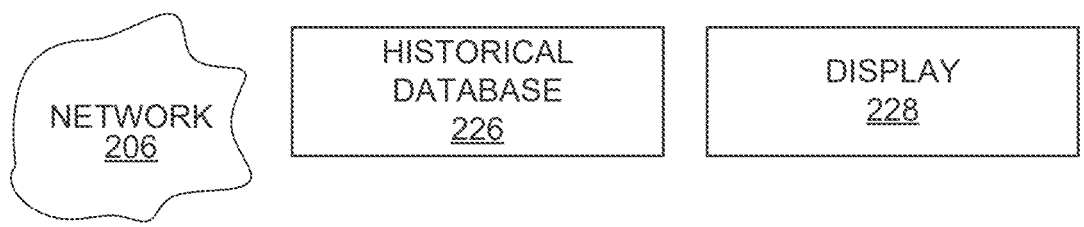

FIG. 2 illustrates an example of an operating environment for a compliance standard system 200 (e.g., the compliance standard system 100) for a regulated entity 202 (e.g., the regulated entity 116) having a number of assets 204. The compliance standard system 200 may represent application software executing on a computing platform of the operating environment. The compliance standard system 200 communicates with the assets 204 via a network 206. The network 206 is, for example, a data network, the Internet, a wide area network (WAN) or a local area (LAN) network. The network 206 serves as a communication medium to various remote devices (e.g., databases, web servers, remote servers, application servers, intermediary servers, client machines, other portable devices, etc.).

The compliance standard system 200 includes a processor 208, a memory 210, a network interface 212, and a display interface 214, which are operably connected for computer communication. The processor 208 processes signals and performs general computing to execute instructions stored in the memory 210. The instructions cause the processor 208 to execute operations. The processor 208 can be a variety of various processors including multiple single and multicore processors, co-processors, and other multiple single and multicore processor and co-processor architectures.

The memory 210 stores an operating system that controls or allocates resources of the compliance standard system. The memory 210 represents a non-transitory machine-readable medium (or other medium), such as RAM, a solid-state drive, a hard disk drive or a combination thereof. The memory 210 includes a virtual auditor 216 that includes modules that operate in concert and/or stages to substantiate compliance with a compliance standard. The modules include a compliance standard module 218, an evidentiary package module 220, a data module 222, and a status module 224. The memory 210 stores machine-readable instructions associated with the modules 218-224. The processor 208 accesses the memory 210 and executes the machine-readable instructions as operations.

A module of the modules 218-224 may be an artificial neural network that acts as a framework for machine learning, including deep learning. For example, a module of the modules 218-224 may be a neural network, a convolution neural network (CNN) or a conditional generative adversarial network (cGAN). A module of the modules 218-224 may include an encoder, decoder, symbol predictor etc. For example, the evidentiary package module 220 may include an autoencoder, a long short-term memory (LSTM), or other artificial recurrent neural network that determines the representations to identify and select parameters of the second evidentiary package in an unsupervised manner. The modules 218-224 may include convolutional layers and bi-directional LSTM layers compare and select the second evidentiary package based on responses to previous regulatory compliance reports, for example, stored in a historical database 226. In various examples, the virtual auditor 216 can include more or fewer of the modules.

The network interface 212 provides software and/or hardware to facilitate data input and output between the compliance standard system 200 and data sources, such as the regulated entity 202 via the network 206. The display interface 214 provides software and hardware to facilitate data input and output between the compliance standard system 100 and a display 228. The display 228 is a device for outputting information and can be a light-emitting diode (LED) display panels, liquid crystal display (LCD) panel, plasma display panels, and touch screen displays, among others. The display 228 includes graphical input controls for a user interface, which can include software and/or hardware-based controls, interfaces, touch screens, or touch pads or plug and play devices for an operator to interact with the virtual auditor 216.

The compliance standard module 218, of the virtual auditor 216, identifies a compliance standard for a regulated entity 202 based on a regulatory compliance report (e.g., the regulatory compliance report 112 of FIG. 1). The compliance standard module 218 receives the regulatory compliance report from a centralized regulatory body (the regulatory body 106 of FIG. 1). In some examples, the regulatory compliance report is a North American Electric Reliability Corporation (NERC) audit evidence request matrix.

The compliance standard module 218 can be implemented with a large language model (LLM) to digest a regulatory compliance report (e.g., NERC documents), region documents, industry partner documents and other (e.g., local) documents. Different regional authorities determine set of parameters for audit compliance based on the regulatory compliance report. For example, the LLM of the compliance standard system 200 digests previous responses, for example stored in the historical database 226, to regulatory compliance reports to determine which parameters were effective in substantiating compliance with the compliance standards of the regulatory compliance reports.

The compliance standard is a threshold requirement for the operations of assets 204 of the regulated entity 202. In some instances, the compliance standard targets an asset 204. As one example, the compliance standard requires that a security patch be installed on a first asset 204. The compliance standard is determined based on compliance standards identified from a regulatory compliance report and/or historical regulatory compliance reports. Historical regulatory compliance reports can also be stored in the historical database 226.

Evidentiary packages define the evidence that substantiates the threshold requirement of the compliance standard as parameters. The evidentiary package module 220 receives a first evidentiary package (e.g., the first evidentiary package 108 of FIG. 1) from the first regional authority (e.g., the first regional authority 102 of FIG. 1). The first evidentiary package includes a first set of parameters that, if satisfied by a first set of operational data (e.g., the first set of operational data 124 of FIG. 1), verify that the threshold requirement of the compliance standard is satisfied. For example, the first evidentiary package includes default parameters that are standard procedure for the first regional authority. In one instance, the compliance standard verifies that a management protocol for patch management is being followed. Accordingly, the first evidentiary package includes a set of default parameters used for patch management. Additional parameters can be added to the first evidentiary package to tailor the set of default parameters to the first regional authority. For example, in response to the first regional authority having a separate update protocol for patch updates to be downloaded, additional parameters are added to the first evidentiary package regarding the update protocol.

The data module 222 selects a first asset 204 of the regulated entity 202 based on the parameters of the first evidentiary package. Continuing the example from above, the data module 222 selects the first asset 204 on which the security patch was installed to retrieve the operational data that demonstrates that the security patch is functional. The data module 222 receives the first set of operational data related to the first asset 204, for example, via centralized data warehouse (e.g., centralized data warehouse 114 of FIG. 1).

The data module 222 collects operational data from the first asset 204 based on the parameters of evidentiary packages. Continuing the example of a security patch being applied, the data module 222 retrieves the first set of operational data from the asset 204, on which the security patch was applied, based on a parameter of the first evidentiary package. If the security patch is a software update that is applied to asset 204 to run new or additional code, the data module 222 requests the first set of operational data, for example, as runtime data with a status indicator of the new or additional code in real-time. If the security patch is applied to close a port of the first asset 204, the data module 222 retrieves the first set of operational data including a status indicator of the port as "closed" or "open."

The data module 222 analyzes the first set of operational data to determine if the first set of operational data is sufficient to substantiate the compliance standard. The data module 222 determines the first set of operational data to be deficient in response to the first set of operational data not satisfying the threshold requirements of the compliance standard. The first set of operational data is deemed deficient due to errors in the data of the first set of operational data, system errors in the regulated entity 116, insufficient data available, location of the data was not found, or absence of data, among others. As an example, suppose that the first asset is unresponsive to the data module 222 during a communications interruption resulting in the first set of operational data including only a timeout notification. Because the timeout notification does not satisfy the threshold requirement for compliance, the data module 222 determines the first set of operational data to be deficient.

In another example, the data module 222 determines that the first set of operational data is deficient for not satisfying the expected operational value of the compliance standard. For instance, suppose that the first asset 204 has a port that can have a status indicator of "open" or "closed." The security patch is applied to close a port of the first asset 204 such that the expected operational value is "closed" after the security patch is applied. In response to the first set of operational data including a status indicator of the port being "open," the data module 222 determines that the first set of operational data is deficient. The first set of operational data including the status indicator "open" is deficient because the first set of operational data does not satisfy the expected operational value of "closed" in the compliance standard.

In response to the data module 222 determining that the first set of operational data is deficient, the virtual auditor 216 triggers the evidentiary package module 220 to determine a second evidentiary package (e.g., the second evidentiary package 110 of FIG. 1) to substantiate the compliance standard. The second evidentiary package may be received from another regional authority or be based on the evidentiary package of another regional authority. As another example, the data module 222 determines the second evidentiary package from historical responses to the regulatory compliance report. The historical date/time stamped responses are stored in the historical database 226. For example, the data module 222 uses historical date/time stamped responses from the first regional authority or other regional authorities, such as the second regional authority (e.g., the second regional authority 104 of FIG. 1).

The evidentiary package module 220 determines the second evidentiary package to include a second set of parameters with different parameters than those of the first set of parameters of the first evidentiary package. The second evidentiary package may be based on different assets, different security assets, different security events, different security results, or different timing among others.

Because the second set of operational data is different than the first set of operational data, the second set of operational data is not necessarily deficient and may satisfy the threshold requirement of the compliance standard. In response to the evidentiary package module 220 identifying the second evidentiary package, the data module 222 collects the second set of operational data from an asset 204 based on the parameters of evidentiary packages. Continuing the example of a security patch being applied, the data module 222 retrieves the second set of operational data from a second asset 204 storing a log of security patches. For example, the log includes a log entry verifying the date and time that the security patch was applied. Accordingly, the second evidentiary package is determined to have parameters that cause the data module 222 to collect the second set of operational data corresponding to the first set of operational data. Thus, the data module 222 analyzes the first set of operational data to determine if the first set of operational data is sufficient to substantiate the compliance standard. In response to the first set of operational data not being sufficient to substantiate the compliance standard, the data module 222 analyzes the second set of operational data to determine that the second set of operational data satisfies the threshold requirements of the compliance standard.

The status module 224 applies a compliance result to the compliance standard based on an analysis of the second set of operational data. If the second set of operational data includes the status indicator of the port of the asset 204, the status module 224 compares the status indicator of the operational data to the expected operational value of the compliance standard. For example, the expected operational value is "closed" to demonstrate that the security patch has been applied to the asset 204. The operational data is analyzed to determine if the status indicator of the second set of operational data comports with the expected operational value, even though the status indicator of the first set of operational data did not. For example, because only a timeout notification was received as the first set of operational data.

In response to the second set of operational data, such as a status indicator of a port of the asset 204 or a log entry, indicating that the port is closed, and therefore, satisfies the expected operational value of the compliance standard, the status module 224 applies a compliance result indicating that the asset 204 is secure. In response to the second set of operational data corresponding to the parameter not satisfying the expected operational value of the compliance standard, for example that the port is open, the status module 224 applies a compliance result, such as a vulnerable status, indicating that the asset 204 is vulnerable. Accordingly, the second set of operational data is evaluated to determine whether a security vulnerability is addressed, in this example, that the security patch is deployed to the asset 204 appropriately.

In some examples, the status module 224 includes providing a notification to a user. The notification indicates the status of the evidentiary package. For example, suppose that the first set of operational data corresponding to the first evidentiary package is unavailable. The second evidentiary package corresponds to a second set of operational data that satisfies the threshold requirement of the compliance standard. The status module 224 generates a notification, such as an evidentiary package narrative, that indicates the first set of operational data was not found but the second set of operational data is expected to satisfy the threshold requirement of the compliance standard. In some examples, the evidentiary package narrative includes a rationale that explains why the second set of operational data should satisfy the compliance standard in place of the first set of operational data. For example, the rationale includes that the second set of operation satisfies the compliance standard based on specified rules, knowledge, technical realities, and/or analysis. Thus, the rationale provides a persuasive argument compliance has been achieved. The notification may be provided to the user the network 206 or displayed on the display 228.

While described with respect to a first evidentiary package and a second evidentiary package for clarity, more evidentiary package may be determined in response to the operational data not satisfying the compliance standard. For example, if the data module 222 analyzes the second set of operational data corresponding to the second evidentiary package and determines that the second set of operational data does not satisfy the threshold requirements of the compliance standard, the evidentiary package module 220 is triggered to determine a third evidentiary package. The third evidentiary package has different parameters than the first evidentiary package and the second evidentiary package.

The third evidentiary package is determined in a similar manner as the second evidentiary package. For example, the third evidentiary package may from a third regional authority different than the first regional authority and the second regional authority. Alternatively, the third evidentiary package may be based on different types of assets. For example, the first evidentiary package is based on cyber assets (e.g., cyber assets 118 of FIG. 1), the second evidentiary package is based on electronic security perimeter assets (e.g., electronic security perimeter assets 120 of FIG. 1), and the third evidentiary package is based on physical security perimeter assets (e.g., physical security perimeter assets 122 of FIG. 1).

The evidentiary package module may be triggered to determine a threshold number of evidentiary packages in response to the operational data of the previous evidentiary package not satisfying the compliance standard. For example, the virtual auditor 216 triggers the evidentiary package module to determine five evidentiary packages before the status module 224 applies a compliance result of "vulnerable" to the compliance standard based on an analysis of the fifth set of operational data. As another example, the virtual auditor 216 triggers the evidentiary package module to determine subsequent evidentiary packages until a threshold time elapses or the previous operational data satisfies the compliance standard.

Alternatively, the evidentiary package module 220 determines that a next evidentiary package is indeterminable. Suppose that an evidentiary package with different parameters than those of the prior evidentiary packages are not identified or the parameters identified are based on the same assets, same security events, same security results, or same timing as the prior evidentiary packages. Then the evidentiary package module 220 may cause the status module 224 to apply a compliance result of "vulnerable" to the compliance standard.

Figure 3:
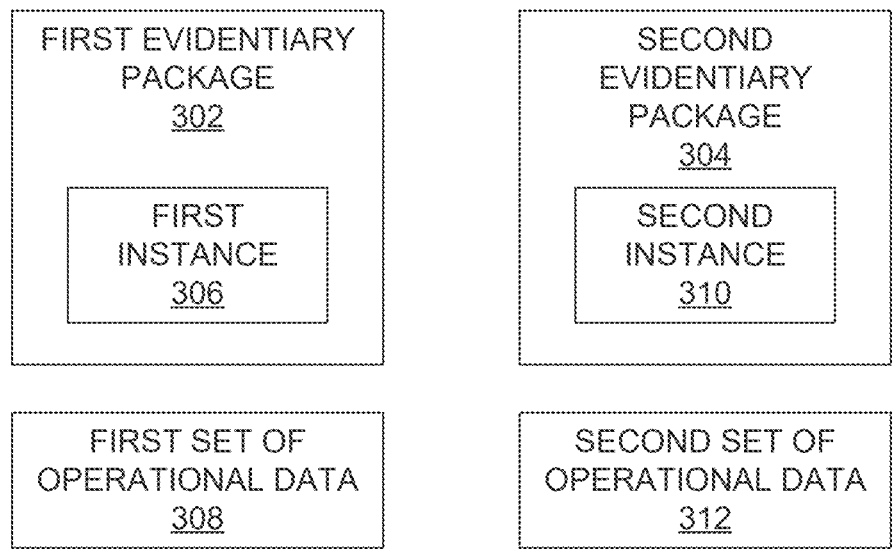
FIG. 3 illustrates examples of evidentiary packages associated with different instances.

FIG. 3 illustrates examples of evidentiary packages, associated with different instances of a security event, including a first evidentiary package 302 and a second evidentiary package 304. Suppose that the compliance standard requires that an asset (e.g., a cyber asset 118, an electronic security perimeter asset 120, a physical security perimeter asset 122 of FIG. 1, the asset 204 of FIG. 2) demonstrates the integrity and confidentiality of user data, and the first evidentiary package 302 has parameters corresponding to a first instance 306 of a security event. The security event is the encryption of the user data.

The parameters of the first evidentiary package 302 identify a first instance 306 of the security event as the encryption of a first packet of the user data. The first instance 306 of the security event is categorized to a security domain. The security domain is a set of conditions, applications, and/or assets that define the environment of the first instance 306. For example, the first instance 306 is a first packet of the user data being demonstrably encrypted. The security domain includes the manner in which the first packet of the user data is encrypted. group policy objects (GPO), a type of encryption service running, a layer and/or level the encryption service is running on, etc.

A data module (e.g., the data module 222 of FIG. 2) collects a first set of operational data 308, for example, a copy or log of the first packet of the user data. In some examples, the data module additionally receives characteristics of the security domain, in this example, including the GPO, the type of encryption service running, a layer and/or level the encryption service is running on, etc. If the data module determines that the first set of operational data 308 is deficient, an evidentiary package module (e.g., the evidentiary package module 220 of FIG. 2) selects a second evidentiary package 304 having parameters corresponding to a second instance 310 of the security event. For example, if the data module determines that the copy or log of the first packet of the user data does not satisfy the compliance standard due to a communication interruption, the first packet being corrupted, or other failure, an evidentiary package module (e.g., the evidentiary package module 220 of FIG. 2) identifies a second packet of the user data being encrypted as a second evidentiary package 304.

The second evidentiary package 304 is determined so that the second instance 310 comports to the characteristics of the security domain. For example, the data module compares characteristics of the security domain associated with second instance 310, such as the GPO, the type of encryption service running, a layer and/or level the encryption service is running on, etc. of the second packet of user data, and selects the second instance based on the characteristics matching the characteristics of the security domain of the first instance 306.

Because the second instance 310 comports to the same security domain of the first instance 306, the second instance 310 of the security event satisfies the compliance standard in the same manner as the first instance 306. For example, even if the first packet is corrupted, the second packet being demonstrably encrypted satisfies the compliance standard. Accordingly, the data module analyzes the second set of operational data 312 based on the second evidentiary package 304. A compliance result is applied to the compliance standard based on an analysis of the second set of operational data 312. In some examples, if the first instance 306 is deficient, a number of sets of operational data, corresponding to a threshold number of instances, are determined to satisfy the expected operational value before a compliance result is applied to the compliance standard.

Figure 4:
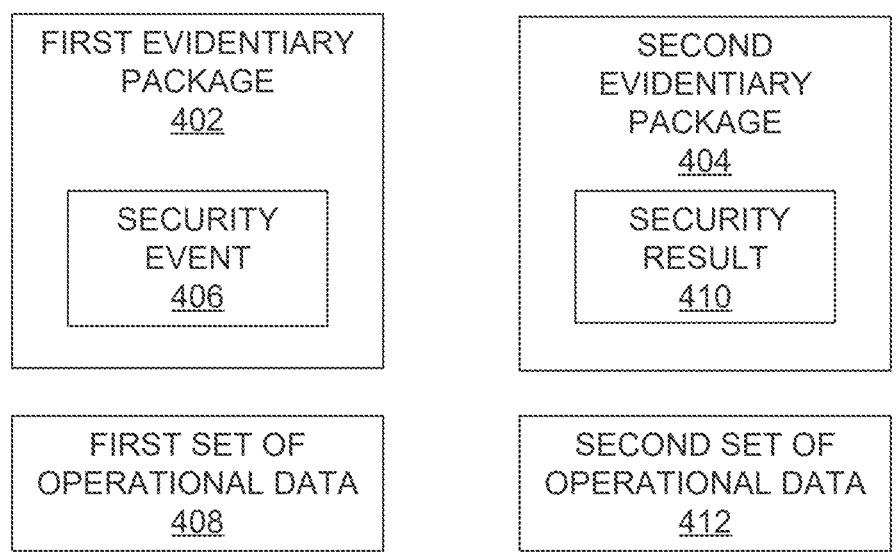
FIG. 4 illustrates examples of evidentiary packages associated with a security event and security result.

FIG. 4 illustrates examples of evidentiary packages, associated with different security results of a security event, including a first evidentiary package 402 and a second evidentiary package 404. Suppose that the compliance standard requires redundancy in monitoring the activity of an asset (e.g., a cyber asset 118, an electronic security perimeter asset 120, a physical security perimeter asset 122 of FIG. 1 and the asset 204 of FIG. 2), and that the first evidentiary package 402 has parameters corresponding to a security event 406 of redundant monitoring.

The parameters of the first evidentiary package 402 identify the security event 406, for example, the systems or protocols monitoring the activity data on an asset. As one example, the security event 406 is the redundant monitoring and the parameters of the first evidentiary package 402 include metadata that demonstrate that the systems and protocols of the redundant monitoring are functioning properly. A data module (e.g., the data module 222 of FIG. 2) collects a first set of operational data 408 that includes the metadata of the systems and protocols. In response to the data module determining that the first set of operational data 408 is deficient, an evidentiary package module (e.g., the evidentiary package module 220 of FIG. 2) selects a second evidentiary package 404 having parameters corresponding to a security result 410. For example, suppose that the data module determines that the first set of operational data 408, corresponding to the security event 406, does not satisfy the compliance standard due to a communication interruption or other failure. In response to this determination, the evidentiary package module identifies the security result 410 of the redundant monitoring. In this example, the security result 410 of the redundant monitoring is a backup of the activity log.

The second evidentiary package 404 is determined so that the parameters include the security result 410 of the security event. Because the security result 410 demonstrates the result of the security event 406, the data module collects a second set of operational data 412, such as the backup. The data module analyzes a second set of operational data 412 based on the second evidentiary package 304. A compliance result is applied to the compliance standard based on an analysis of the second set of operational data 412. Accordingly, the second evidentiary package is identified with different parameters when the parameters of the first evidentiary package do not meet the threshold requirements of the compliance standard even when the bulk utility assets are operating in compliance. Thus, the second evidentiary package is determined to address false alarms during compliance auditing that would require intensive man hours to identify and overcome.

Figure 5:
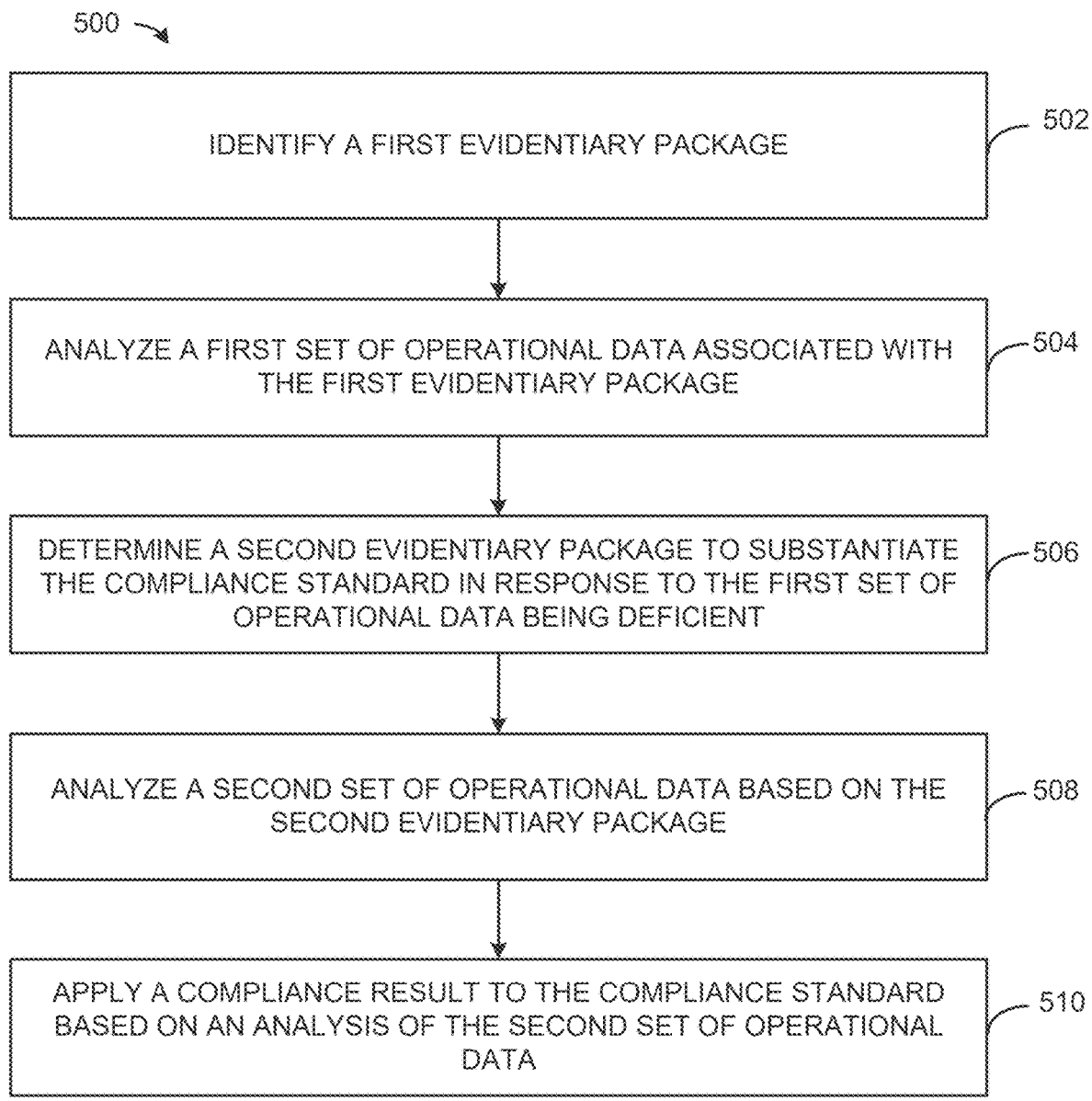
FIG. 5 illustrates a flowchart of an example method for a compliance standard system for a regulated entity.

FIG. 5 illustrates a flowchart of an example method 500 for substantiating compliance of compliance standards for the regulated entity. FIG. 5 will also be described with reference to FIGS. 1-4. For simplicity, the method 500 will be described as a sequence of blocks, but it is understood that the elements of the method 500 can be organized into different architectures, elements, stages, and/or processes. For purposes of simplification, FIGS. 1-4 employ the same reference numbers to denote the same structure.

At block 502, the method 500 includes identifying a first evidentiary package (e.g., the first evidentiary package 108 of FIG. 1, the first evidentiary package 302 of FIG. 3, the first evidentiary package 402 of FIG. 4) of a set of evidentiary packages to substantiate a compliance standard of a regulated entity (e.g. the regulated entity 116 of FIG. 1, the regulated entity 202 of FIG. 2) based on a regulatory compliance report (e.g., the regulatory compliance report 112 of FIG. 1). The evidentiary packages of the set of evidentiary packages define status indicators for the regulated entity to meet the compliance standard.

At block 504, the method 500 includes analyzing a first set of operational data (e.g., the first set of operational data 124 of FIG. 1, the first set of operational data 308 of FIG. 3, the first set of operational data 408 of FIG. 4) associated with the first evidentiary package.

At block 506, the method 500 includes determining a second evidentiary package (e.g., the second evidentiary package 110 of FIG. 1, the second evidentiary package 304 of FIG. 3, the second evidentiary package 404 of FIG. 4) to substantiate the compliance standard in response to the first set of operational data being deficient. The first set of operational data is deemed deficient due to errors in the data of the first set of operational data, system errors in the regulated entity, insufficient data available, or absence of data, among others. The second evidentiary package has a second set of parameters that are different than the parameters of the first evidentiary package.

At block 508, the method 500 includes analyzing a second set of operational data (e.g., the second set of operational data 126 of FIG. 1, the second set of operational data 312 of FIG. 3, the second set of operational data 412 of FIG. 4) based on the second evidentiary package.

At block 510, the method 500 includes applying a compliance result to the compliance standard based on an analysis of the second set of operational data. In response the compliance result, the control parameters of the asset are updated to cause the asset to alter operation of the asset. The control parameters alter the functioning, operation, or execution of the asset. For example, a control parameter causes the asset to update security functions, such as causing the asset to update software. In another example, a user receives a notification of the compliance result. The compliance result is provided to the user via the display (e.g., the display 228 of FIG. 2) and includes, for example, a compliance map depicting a status of assets throughout the territory annotated with the compliance result. The compliance map may identify assets associated with the parameters of the first evidentiary package to indicate potential failure points. Accordingly, the compliance map is provided in an easy to digest format that can enable the user to detect a potential future non-compliance with the regulatory compliance report, such as the NERC audit.

Figure 6:
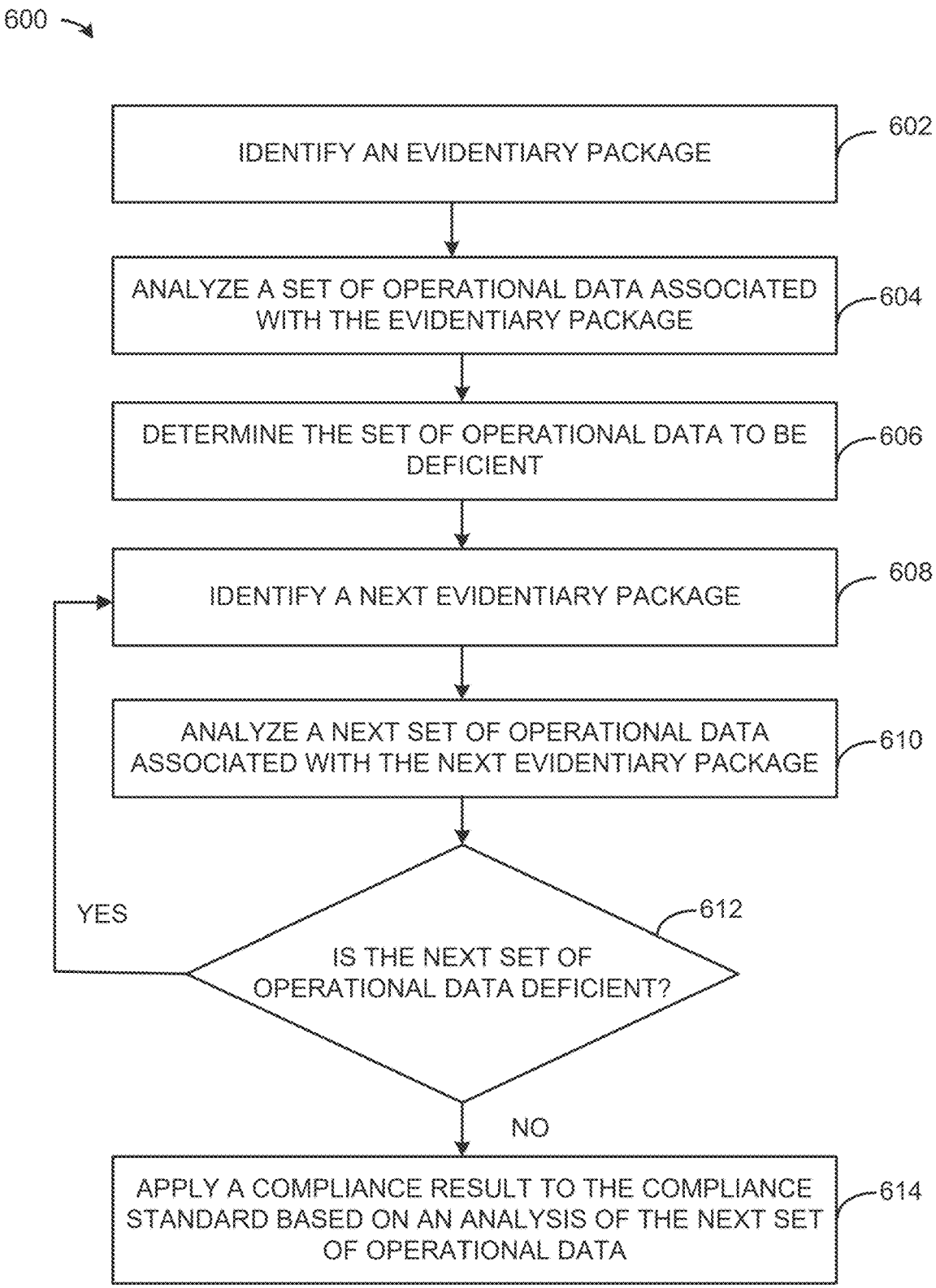
FIG. 6 illustrates a flowchart of another example method for a compliance standard system for a regulated entity.

FIG. 6 illustrates flowchart of another example method 600 for substantiating compliance of compliance standards for the regulated entity of assets. FIG. 6 will also be described with reference to FIGS. 1-5. For simplicity, the method 600 will be described as a sequence of blocks, but it is understood that the elements of the method 600 can be organized into different architectures, elements, stages, and/or processes. For purposes of simplification, FIGS. 1-6 employ the same reference numbers to denote the same structure.

At block 602, the method 600 includes identifying an evidentiary package (e.g., the first evidentiary package 108 of FIG. 1, the first evidentiary package 302 of FIG. 3, the first evidentiary package 402 of FIG. 4) to substantiate a compliance standard of a regulated entity (e.g. the regulated entity 116 of FIG. 1, the regulated entity 202 of FIG. 2) based on a regulatory compliance report (e.g., the regulatory compliance report 112 of FIG. 1). The evidentiary packages of the set of evidentiary packages define status indicators for the regulated entity to meet the compliance standard.

At block 604, the method 600 includes analyzing a set of operational data (e.g., the first set of operational data 124 of FIG. 1, the first set of operational data 308 of FIG. 3, the first set of operational data 408 of FIG. 4) associated with the evidentiary package. As one example, the analysis includes comparing the set of operational data, corresponding to the parameters of the evidentiary package, to the expected operational value of the compliance standard.

At block 606, the method 600 includes determining the set of operational data to be deficient. The set of operational data may not satisfy threshold requirement of the compliance standard for various reasons including errors in the data of the set of operational data, system errors in the regulated entity, insufficient data available, the set of operational data not being found, and the absence of data, among others. As one example, the set of operational data may be determined to be deficient because the set of operational data does not satisfy the expected operational value of the compliance standard.

At block 608, the method 600 includes identifying a next evidentiary package (e.g., the second evidentiary package 110 of FIG. 1, the second evidentiary package 304 of FIG. 3, the second evidentiary package 404 of FIG. 4) to substantiate the compliance standard in response to the set of operational data being deficient. The next evidentiary package has a next set of parameters that are different than the parameters of the previous evidentiary package.

At block 610, the method 600 includes analyzing a next set of operational data (e.g., the second set of operational data 126 of FIG. 1, the second set of operational data 312 of FIG. 3, the second set of operational data 412 of FIG. 4) based on the next evidentiary package. For example, the analysis includes comparing the next set of operational data, corresponding to the parameters of the next evidentiary package, to the expected operational value of the compliance standard.

At block 612, the method 600 includes determining whether the next set of operational data is deficient. Continuing the example from above, the next set of operational data is compared to the expected operational value of the compliance standard. In response to the next set of operational data being deemed deficient, the method 600 returns to block 608. In one instance, the next set of operational data is a second set of operational data that is determined to be deficient for not satisfying the expected operational value of the compliance. The method 600 returns to the block 608 and a next evidentiary package is identified, such as a third evidentiary package. At block 610, a third set of operational data, corresponding to the third evidentiary package, is analyzed. In this manner, the virtual auditor (e.g., the virtual auditor 216 of FIG. 2) continues to identify next evidentiary packages (e.g., a fourth evidentiary package, a fifth evidentiary package, etc.), until a next set of operational data is determined to satisfy the expected operational value of the compliance standard.

In response to the next set of operational data not being deemed deficient, the method 600 continues to block 614. At block 614, the method 600 includes applying a compliance result to the compliance standard based on an analysis of the next set of operational data. In response the compliance result, the control parameters of the asset are updated to cause the asset to alter operation of the asset. The control parameters alter the functioning, operation, or execution of the asset. For example, a control parameter causes the asset to update security functions, such as causing the asset to update software. In another example, a user receives a notification of the compliance result. The compliance result is provided to the user via the display (e.g., the display 228 of FIG. 2). In one example, the notification is a compliance map depicting a status of assets throughout the territory annotated with the compliance result.

In another example, the notification is an evidentiary package narrative provided to the user via the display. The evidentiary package narrative may include the parameters of the next evidentiary package and/or the next set of operational data that satisfies the compliance standard. In some examples, the evidentiary package narrative includes technical details of the compliance standard, status of assets, etc. For example, the evidentiary package narrative includes a rationale that explains the manner in which the second set of operational data satisfies the compliance standard in lieu of the first set of operational data. The rationale specifies the rules, knowledge, technical realities, and/or analysis that show that the second set of operation satisfies the compliance standard. Thus, the rationale provides a persuasive argument compliance has been achieved. Accordingly, the compliance standard system determines a next evidentiary package to substantiate the compliance standard in response to the set of operational data being deficient and provides a rationale for the submission of the next evidentiary package. The rationale can be submitted in response to the regulatory compliance report to demonstrate that despite the set of operational data being deficient, the compliance standard is satisfied by the next set of operational data.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

A "value" as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value of X may be given as a percentage between 0% and 100%. In other cases, the value of X could be a value in the range between 1 and 10. In still other cases, the value of X may not be a numerical value, but could be associated with a given discrete state, such as "not X", "slightly x", "x", "very x" and "extremely x".

In this description, unless otherwise stated, "about," "approximately" or "substantially" preceding a parameter means being within +/−10 percent of that parameter. Modifications are possible in the described embodiments, and other embodiments are possible, within the scope of the claims.

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method comprising:
   identifying a first evidentiary package of a set of evidentiary packages to substantiate a compliance standard of a regulated entity based on a regulatory compliance report, wherein evidentiary packages of the set of evidentiary packages defines status indicators for the regulated entity to meet the compliance standard;
   analyzing a first set of operational data associated with the first evidentiary package;
   determining a second evidentiary package to substantiate the compliance standard in response to the first set of operational data being deficient;
   analyzing a second set of operational data based on the second evidentiary package; and
   applying a compliance result to the compliance standard based on an analysis of the second set of operational data.

2. The method of claim 1, wherein the first set of operational data is received from a first asset and the second set of operational data is from a second asset different than the first asset, wherein the second evidentiary package is determined based on access of the second asset to the second set of operational data corresponding to the first set of operational data.

3. The method of claim 2, wherein the first asset is a cyber asset and the second asset is an electronic security perimeter asset.

4. The method of claim 1, further comprising:
   identifying a first instance of a security event from the first evidentiary package;
   categorizing the first instance of the security event to a security domain; and
   identifying a second instance of the security event in the security domain, wherein determining the second evidentiary package includes selecting an evidentiary package that includes the second instance of the security event.

5. The method of claim 1, further comprising:
   identifying a security event from the first evidentiary package; and
   identifying a security result of the security event, wherein determining the second evidentiary package includes selecting an evidentiary package that includes the security result.

6. The method of claim 1, wherein the first set of operational data is deficient due to the first set of operational data being unavailable.

7. The method of claim 1, wherein the second set of operational data is a backup of the first set of operational data.

8. The method of claim 1, wherein the compliance standard targets an asset, the method further comprising:
   updating control parameters of the asset based on the compliance result to alter operation of the asset, wherein the control parameters cause the asset to update security functions.

9. The method of claim 1, further comprising:
   providing a user with a notification including an evidentiary package narrative having a rationale that specifies rules, knowledge, technical realities, and/or analysis that demonstrate that the second set of operation satisfies the compliance standard in lieu of the first set of operational data.

10. A compliance standard system comprising:
a memory for storing machine-readable instructions; and
a processor for accessing the machine-readable instructions and executing the machine-readable instructions as operations, the operations comprising:
   identifying a first evidentiary package of a set of evidentiary packages to substantiate a compliance standard of a regulated entity based on a regulatory compliance report, wherein evidentiary packages of the set of evidentiary packages defines status indicators for the regulated entity to meet the compliance standard;
   analyzing a first set of operational data associated with the first evidentiary package;
   determining a second evidentiary package to substantiate the compliance standard in response to the first set of operational data being deficient;
   analyzing a second set of operational data based on the second evidentiary package; and
   applying a compliance result to the compliance standard based on an analysis of the second set of operational data.

11. The compliance standard system of claim 10, wherein the first set of operational data is received from a first asset and the second set of operational data is from a second asset different than the first asset, wherein the second evidentiary package is determined based on access of the second asset to the second set of operational data corresponding to the first set of operational data.

12. The compliance standard system of claim 10, the operations further comprising:
   identifying a first instance of a security event from the first evidentiary package;
   categorizing the first instance of the security event to a security domain; and
   identifying a second instance of the security event in the security domain, wherein determining the second evidentiary package includes selecting an evidentiary package that includes the second instance of the security event.

13. The compliance standard system of claim 10, the operations further comprising:
   identifying a security event from the first evidentiary package; and
   identifying a security result of the security event, wherein determining the second evidentiary package includes selecting an evidentiary package that includes the security result.

14. The compliance standard system of claim 10, wherein the second set of operational data is a backup of the first set of operational data.

15. The compliance standard system of claim 10, wherein the compliance standard targets an asset, the operations further comprising:
   updating control parameters of the asset based on the compliance result to alter operation of the asset.

16. A non-transitory machine-readable medium having machine executable instructions for a virtual auditor causing a processor to execute operations, the operations comprising:
   identifying a first evidentiary package of a set of evidentiary packages to substantiate a compliance standard of a regulated entity based on a regulatory compliance report, wherein evidentiary packages of the set of evidentiary packages defines status indicators for the regulated entity to meet the compliance standard;
   analyzing a first set of operational data associated with the first evidentiary package;
   determining a second evidentiary package to substantiate the compliance standard in response to the first set of operational data being deficient;
   analyzing a second set of operational data based on the second evidentiary package; and
   applying a compliance result to the compliance standard based on an analysis of the second set of operational data.

17. The non-transitory machine-readable medium of claim 16, the operations further comprising:
   identifying a first instance of a security event from the first evidentiary package;
   categorizing the first instance of the security event to a security domain; and
   identifying a second instance of the security event in the security domain, wherein determining the second evidentiary package includes selecting an evidentiary package that includes the second instance of the security event.

18. The non-transitory machine-readable medium of claim 16, the operations further comprising:
   identifying a security event from the first evidentiary package; and
   identifying a security result of the security event, wherein determining the second evidentiary package includes selecting an evidentiary package that includes the security result.

19. The non-transitory machine-readable medium of claim 16, wherein the compliance standard targets an asset, the operations further comprising:
   updating control parameters of the asset based on the compliance result to alter operation of the asset, wherein the control parameters cause the asset to update security functions.

20. The non-transitory machine-readable medium of claim 16, the operations further comprising:
   providing a user with a notification including an evidentiary package narrative having a rationale that specifies rules, knowledge, technical realities, and/or analysis that demonstrate that the second set of operation satisfies the compliance standard in lieu of the first set of operational data.

* * * * *